United States Patent
Hung (10) Patent No.: US 10,447,066 B2
(45) Date of Patent: Oct. 15, 2019

(54) DRAINABLE WIRELESS CHARGING DEVICE

(71) Applicant: SYMHOPE CO., Taipei (TW)

(72) Inventor: Shao Hang Hung, Taipei (TW)

(73) Assignee: Symhope Co., Taipei (TW)

(*) Notice: Subject to any disclaimer, the term of this patent is extended or adjusted under 35 U.S.C. 154(b) by 54 days.

(21) Appl. No.: 15/860,814

(22) Filed: Jan. 3, 2018

(65) Prior Publication Data

US 2018/0205258 A1    Jul. 19, 2018

(30) Foreign Application Priority Data

Jan. 18, 2017   (TW) .............................. 106101696 A (51) Int. Cl.
| | | |
|---|---|---|
| *H02J 7/02* | (2016.01) | |
| *H01M 2/10* | (2006.01) | |
| *H02J 7/00* | (2006.01) | |
| *H02J 50/10* | (2016.01) | |

(52) U.S. Cl.
CPC ............ *H02J 7/025* (2013.01); *H01M 2/1066* (2013.01); *H01M 2/1094* (2013.01); *H02J 7/0042* (2013.01); *H02J 50/10* (2016.02)

(58) Field of Classification Search
CPC .......... H02J 7/025; H02J 50/10; H02J 7/0042; H01M 2/1066; H01M 2/1094
USPC ........................................................ 320/107
See application file for complete search history.

(56) References Cited

U.S. PATENT DOCUMENTS

| | | | | |
|---|---|---|---|---|
| 7,630,742 B2 * | 12/2009 | Park | ...................... | G06F 1/1613 455/128 |
| 9,993,050 B2 * | 6/2018 | Lee | ...................... | A44C 5/2076 |
| 2018/0343023 A1 * | 11/2018 | Park | .................. | H04M 1/72519 |

* cited by examiner

*Primary Examiner* — M Baye Diao
(74) *Attorney, Agent, or Firm* — C. G. Mersereau; DeWitt LLP (57) ABSTRACT

A drainable wireless charging device includes a power emitting unit assembled on a first connection member in a waterproof manner and a power receiving unit assembled on a second connection member in a waterproof manner. The first connection member and the second connection member respectively have an insertion groove and an inserting portion for inserting into the insertion groove. The insertion groove has a second attaching surface corresponding to the power receiving unit. The inserting portion has a first attaching surface corresponding to the power emitting unit. The first connection member and the second connection member, and the first attaching surface is closely attached against the second attaching surface, so that water can be drained from the space between the first attaching surface and the second attaching surface.

11 Claims, 9 Drawing Sheets

DRAINABLE WIRELESS CHARGING DEVICE

BACKGROUND OF THE INVENTION

Field of the Invention

The present invention relates to a charging device, in particular to a wireless charging device used in underwater circumstances.

Description of the Prior Art

For underwater tasks, several electronic devices, e.g., searchlights, cameras, propellers, may be needed according to different operation requirements. Because of the limitation of the circumstances, these devices cannot be connected to main supply; instead, these devices are powered by batteries. However, the battery capacity is limited, and the battery has to be charged when the device is used for a period of time. Hence, in the underwater circumstances, these devices cannot be replace battery in a wired connection manner, and the battery with function of wireless charging is suitable for charging these devices used in underwater circumstances.

In the aforementioned wireless charging, the charger and the device are respectively provided with an emitting end and a receiving end, and the charger and the device can be spaced by a distance. The charger emits electromagnetic waves via the emitting end, and the device receives the electromagnetic waves and converts the electromagnetic waves into electrical energy via the receiving end, so that the electrical energy can be charged into the battery. However, in the underwater circumstances, the space between the emitting end and the receiving end is occupied by water, thus the transmission of the electromagnetic waves is absorbed by the water. As a result, the efficiency for charging the battery is poor, and the underwater tasks cannot be achieved properly.

SUMMARY OF THE INVENTION

One object of the present invention is to provide a drainable wireless charging device. When the device is charged in underwater circumstances, water between the emitting end and the receiving end of the electromagnetic waves can be drained, the absorbance of the transmission of electromagnetic waves from water can be reduced, and the charging efficiency can be improved.

To achieve the above and other objects, a drainable wireless charging device is provided and comprises:

a power emitting unit, converting electrical energy into electromagnetic waves and emitting the electromagnetic waves outwardly, wherein the power emitting unit is assembled on a first connection member in a waterproof manner;

a power receiving unit, converting the electromagnetic waves into electrical energy and storing the electrical energy, wherein the power receiving unit is assembled on a second connection member in a waterproof manner;

one of the connection members comprising an insertion groove, and the other connection member comprising an inserting portion, wherein the insertion groove comprises a drain hole communicating with outside, and the insertion groove comprises a second attaching surface corresponding to the power receiving unit, the inserting portion comprises a first attaching surface corresponding to the power emitting unit, the first connection member and the second connection member are capable of being combined with each other by inserting the inserting portion into the insertion groove, the first attaching surface is closely attached against the second attaching surface, so that water is drained from a space between the first attaching surface and the second attaching surface.

Figure 3:
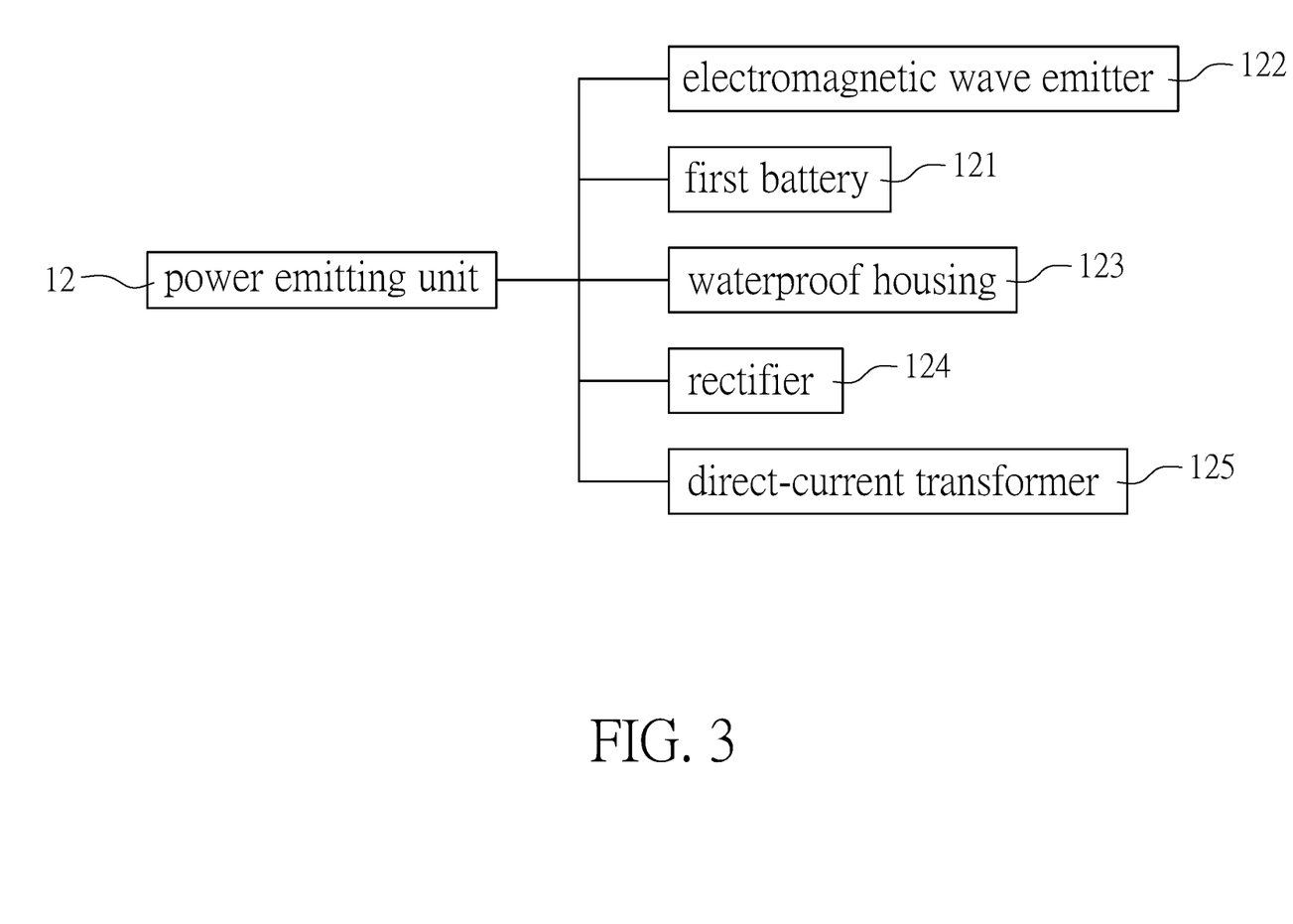
FIG. 3 illustrates a block diagram of the power emitting unit of the drainable wireless charging device of the exemplary embodiment of the present invention.

In one embodiment, as shown in FIG. 3, the power emitting unit comprises a battery, a rectifier, a direct-current transformer, and an electromagnetic wave emitter which are packed by a detachable waterproof housing, the housing is openable for replacing the battery. Alternatively, the battery may be charged by connecting the rectifier and the direct-current transformer to the main supply.

Figure 4:
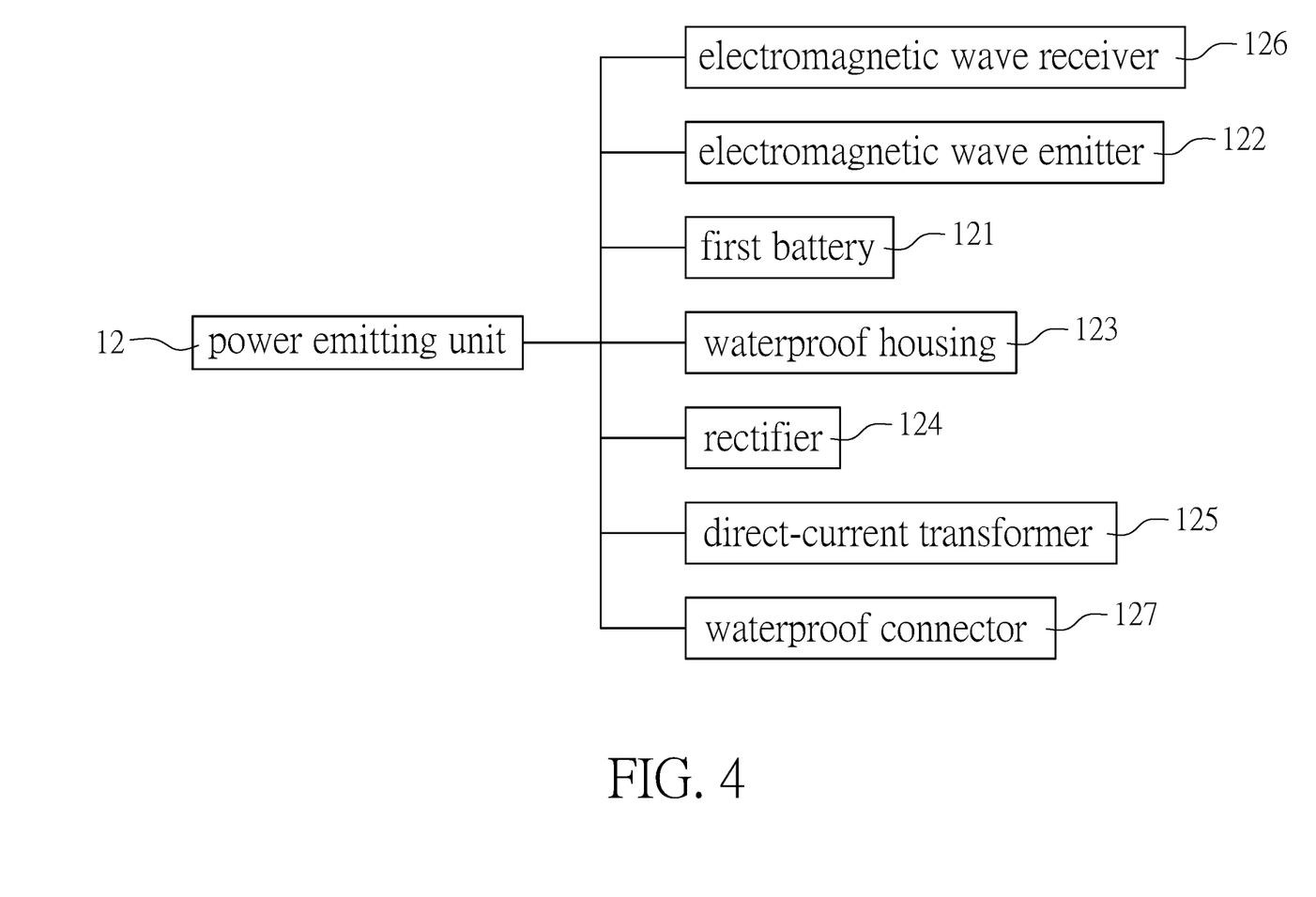
FIG. 4 illustrates another block diagram of the power emitting unit of the drainable wireless charging device of the exemplary embodiment of the present invention.

In one embodiment, as shown in FIG. 4, the power emitting unit comprises a battery, a rectifier, a direct-current transformer, a waterproof connector, and an electromagnetic wave emitter which are packed by an undetachable waterproof housing. The battery may be charged by connecting the rectifier and the direct-current transformer to the main supply. Alternatively, the battery may be charged by connecting the waterproof connector to outer power source in underwater circumstances. The power emitting unit further comprises an electromagnetic wave receiver electrically connected to the battery, and the power emitting unit is used for receiving the electromagnetic waves, converting the electromagnetic waves into electrical energy, and wirelessly charging the battery.

Figure 6:
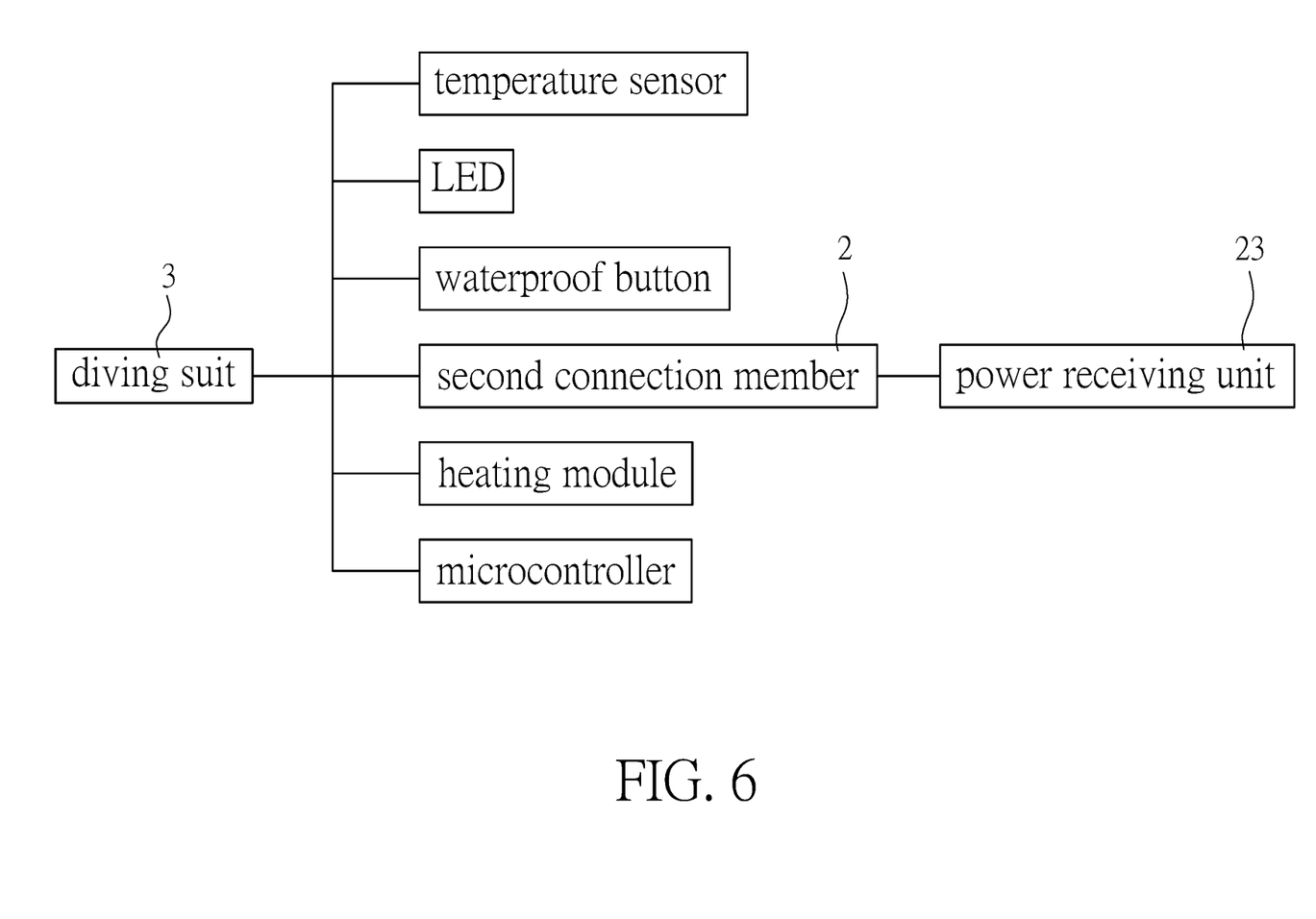
FIG. 6 illustrates a block diagram of the assembly of the drainable wireless charging device and a diving suit.

In one embodiment, as shown in FIG. 6, the second connection member is assembled on a diving suit capable of being heated by electricity. The power receiving unit is electrically connected to the diving suit to provide electricity to the diving suit.

Figure 7:
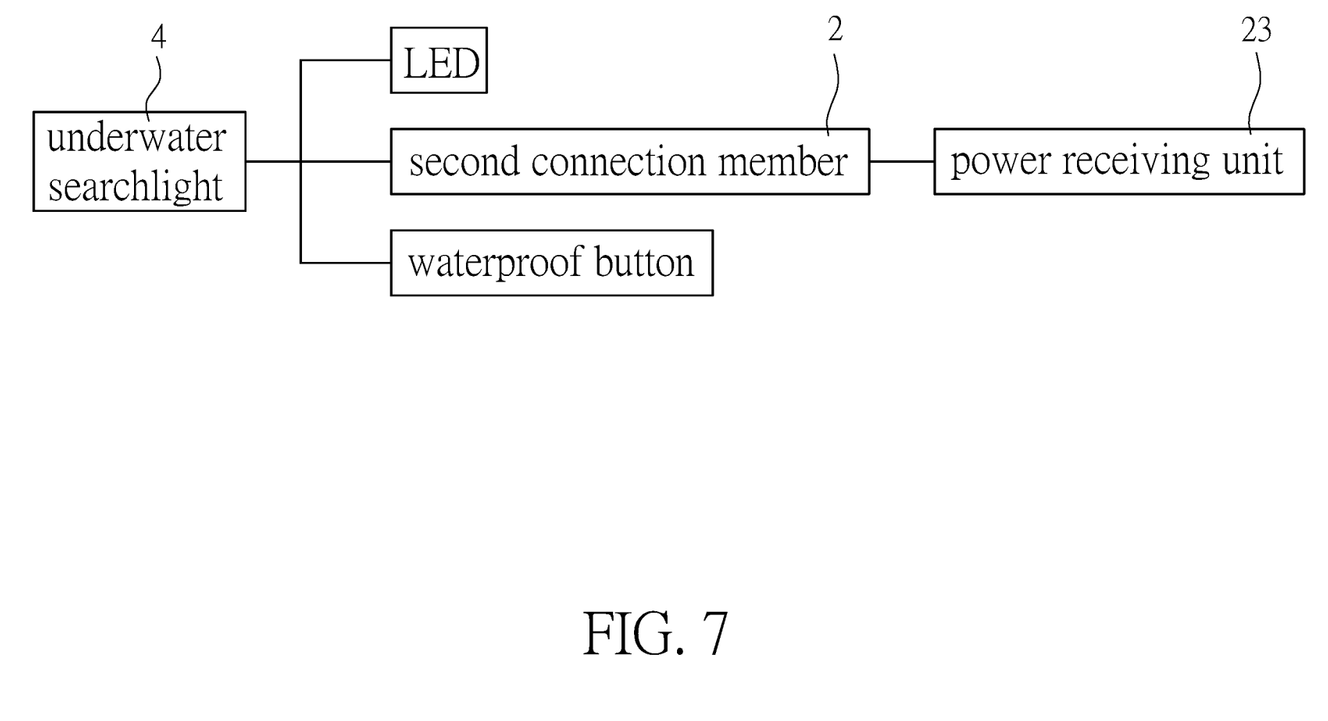
FIG. 7 illustrates a block diagram of the assembly of the drainable wireless charging device and an underwater searchlight.

In one embodiment, as shown in FIG. 7, the second connection member is assembled on an underwater searchlight capable of being driven by electricity. The power receiving unit is electrically connected to the underwater searchlight to provide electricity to the underwater searchlight.

Figure 8:
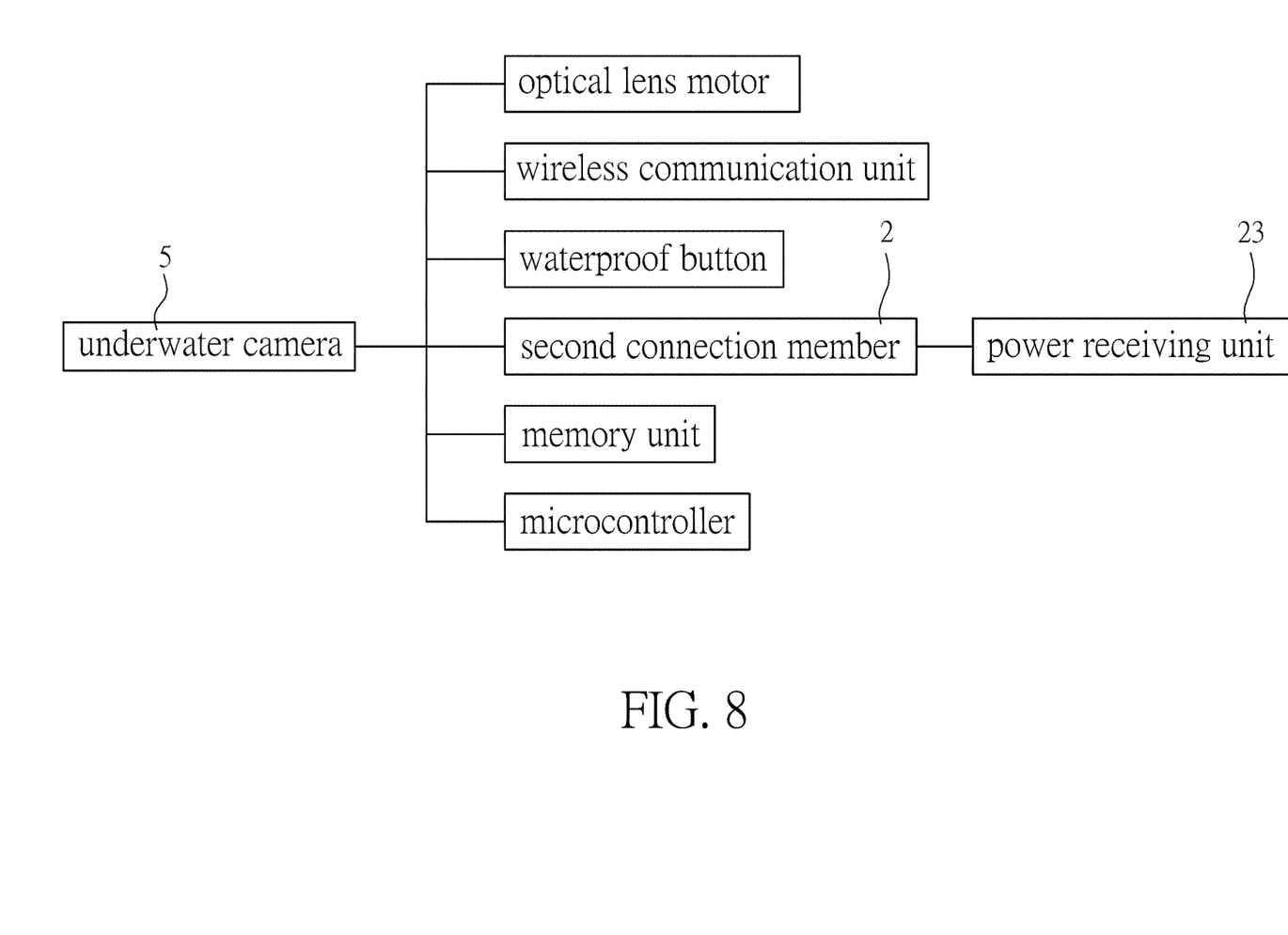
FIG. 8 illustrates a block diagram of the assembly of the drainable wireless charging device and an underwater camera.

In one embodiment, as shown in FIG. 8, the second connection member is assembled on an underwater camera capable of being driven by electricity. The power receiving unit is electrically connected to the underwater camera to provide electricity to the underwater camera.

Figure 9:
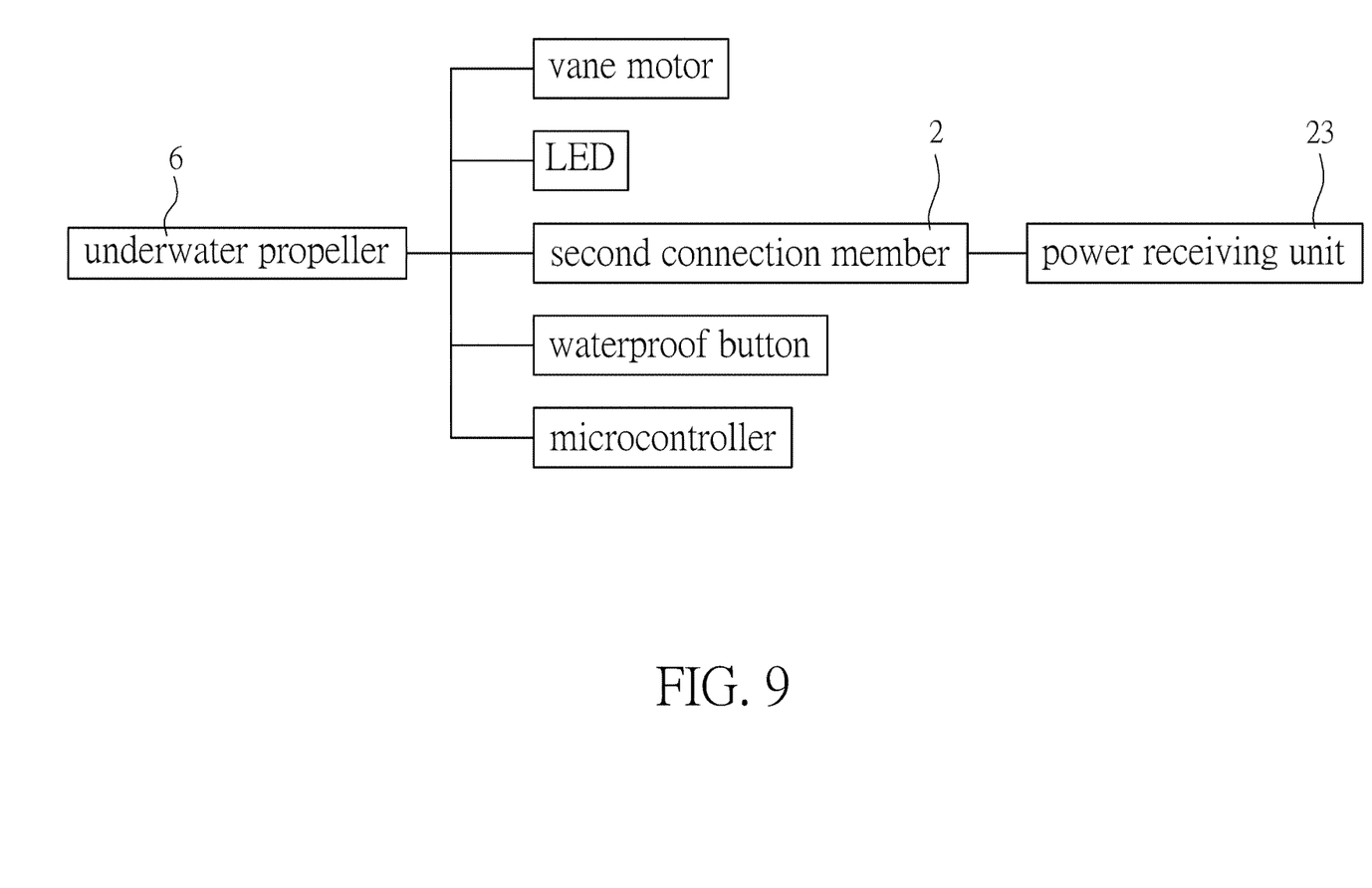
FIG. 9 illustrates a block diagram of the assembly of the drainable wireless charging device and an underwater propeller.

In one embodiment, as shown in FIG. 9, the second connection member is assembled on an underwater propeller capable of being driven by electricity. The power receiving unit is electrically connected to the underwater propeller to provide electricity to the underwater propeller.

DETAILED DESCRIPTION OF THE PREFERRED EMBODIMENTS

Figure 1:
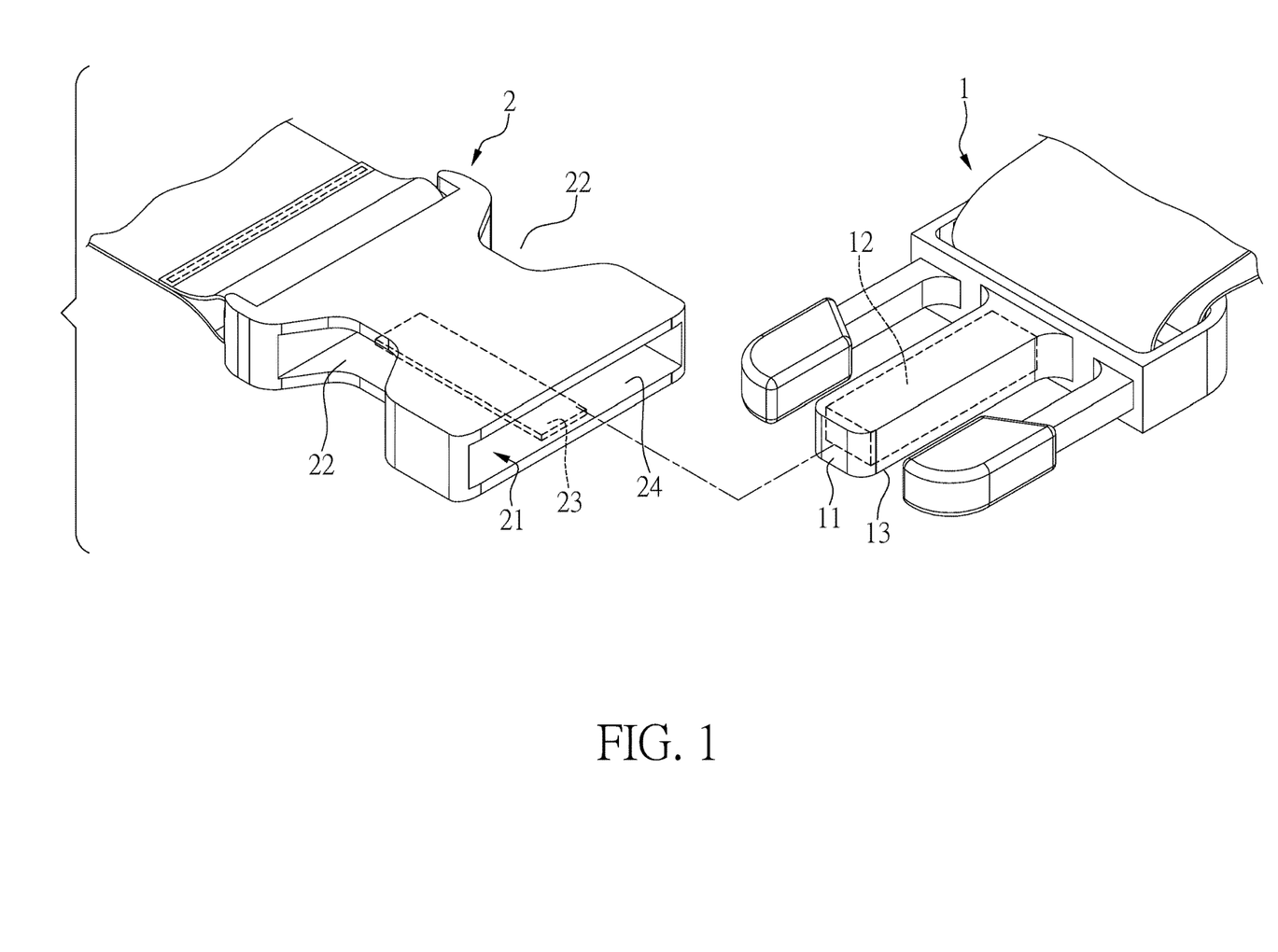
FIG. 1 illustrates a perspective view of a drainable wireless charging device according to an exemplary embodiment of the present invention.
Figure 2:
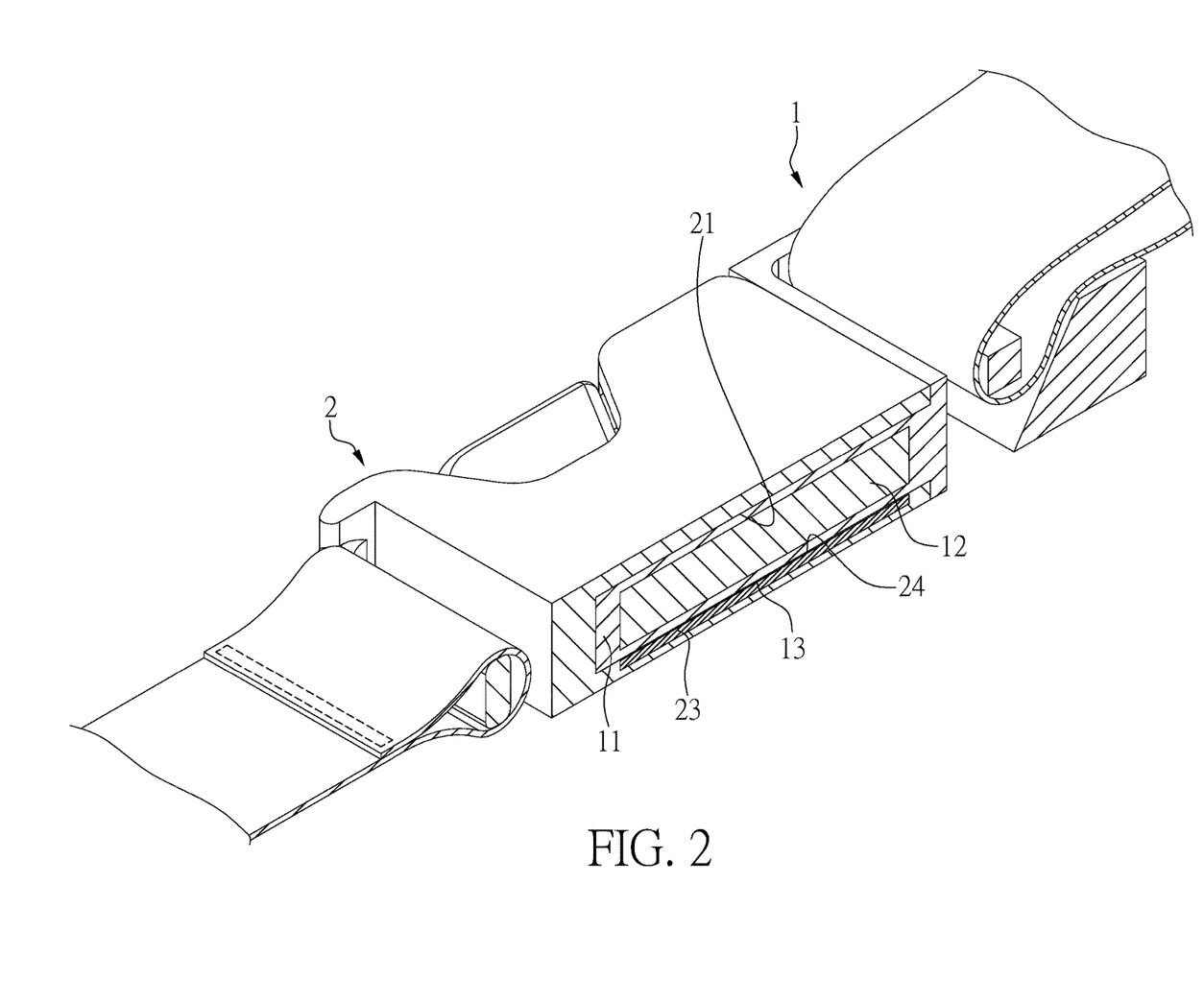
FIG. 2 illustrates an operational sectional view of the drainable wireless charging device of the exemplary embodiment of the present invention.

Please refer to FIGS. 1 and 2, illustrating a drainable wireless charging device according to an exemplary embodiment of the present invention. The drainable wireless charging device comprises a first connection member 1 and a second connection member 2. One of the connection members comprises an insertion groove 21, and the other connection member comprises an inserting portion 11. In addition, the first connection member 1 and the second connection member 2 can be combined with each other by inserting the inserting portion 11 into the insertion groove 21. In this embodiment, the first connection member 1 and the second connection member 2 are an assembly of buckling components. The inserting portion 11 is extending from the first connection member 1, the insertion groove 21 is recessed from the second connection member 2, and the second connection member 2 further comprises a drain hole 22 formed on the insertion groove 21 and communicating with outside.

Moreover, the first connection member 1 comprises a power emitting unit 12 used for converting electrical energy into electromagnetic waves and emitting the electromagnetic waves outwardly. In this embodiment, the power emitting unit 12 is assembled on the inserting portion 11 as shown in FIG. 3. As shown, the power emitting unit 12 has a first battery 121, a rectifier 124, a direct-current transformer 125, and an electromagnetic wave emitter 122 which are packed by a detachable waterproof housing 123. The electromagnetic wave emitter 122 can convert electricity provided by the first battery 121 into electromagnetic waves and emit the electromagnetic waves. When the first battery 121 runs of out power, the waterproof housing 123 may be detached for replacing the first battery 121; alternatively, the first battery 121 may be charged wiredly by connecting the rectifier 124 and the direct-current transformer 125 to the main supply. The inserting portion 11 comprises a first attaching surface 13 corresponding to the power emitting unit 12.

In another embodiment, as shown in FIG. 4, the waterproof housing 123 is undetachable, and the first battery 121 is sealed in the waterproof housing 123 and cannot be replaced. In such condition, when the first battery 121 runs out of power, the first battery 121 may be charged wiredly by connecting the rectifier 124 and the direct-current transformer 125 to the main supply. Furthermore, the power emitting unit 12 comprises an electromagnetic wave receiver 126 electrically connected to the first battery 121, and the electromagnetic wave receiver 126 can receive electromagnetic waves from outside and convert the electromagnetic waves into electrical energy for wirelessly charging the first battery 121, so that the power emitting unit 12 can perform operation continuously. Moreover, the power emitting unit 12 further comprises a waterproof connector 127, so that the power emitting unit 12 charges the first battery 121 wiredly by connecting the waterproof connector 127 to an outer power source in underwater circumstances.

Figure 5:
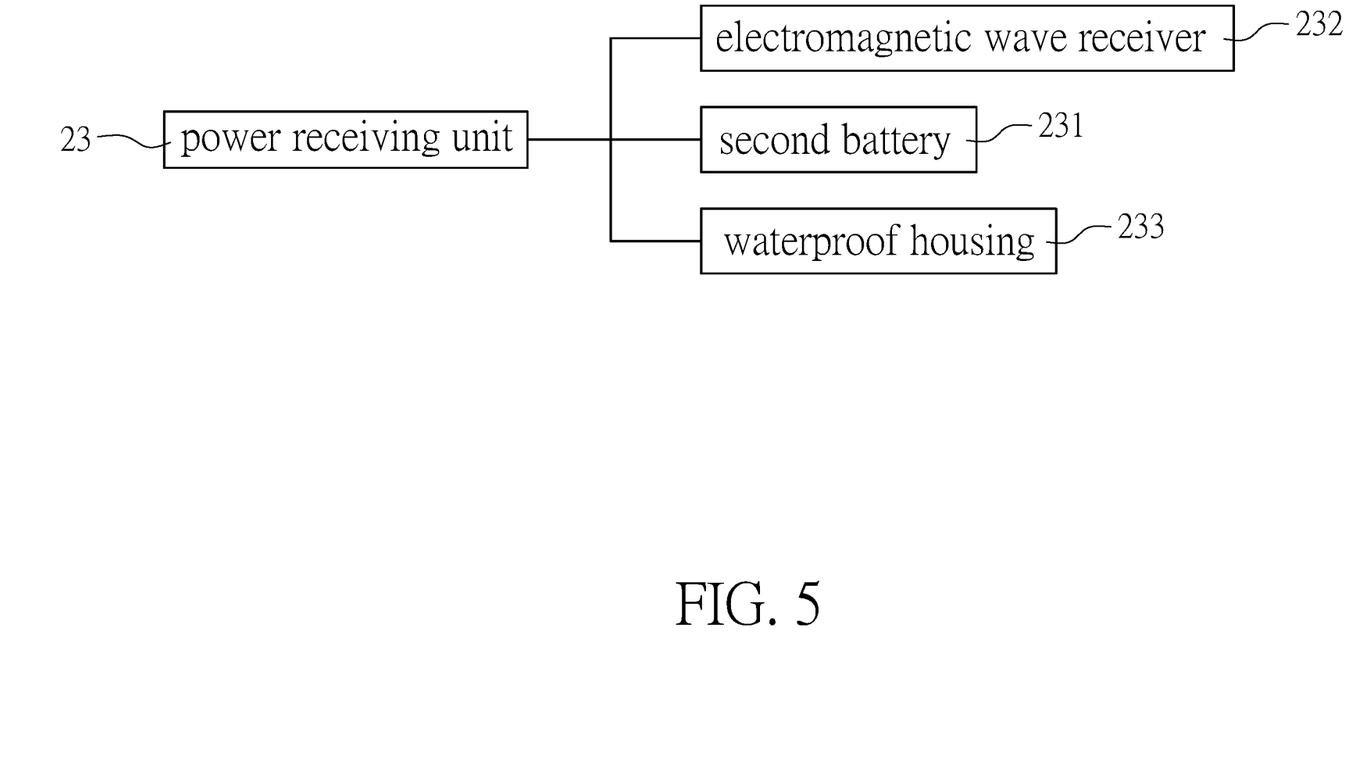
FIG. 5 illustrates a block diagram of the power receiving unit of the drainable wireless charging device of the exemplary embodiment of the present invention.

As shown in FIGS. 1 and 2, the second connection member 2 comprises a power receiving unit 23 as shown in FIG. 5. As shown, the power receiving unit 23 comprises a second battery 231 and an electromagnetic wave receiver 232 which are packed by a waterproof housing 233. The power receiving unit 23 is used for receiving electromagnetic waves from outside, converting the electromagnetic waves into electrical energy, and storing the electrical energy. The insertion groove 21 comprises a second attaching surface 24 corresponding to the power receiving unit 23. The inserting portion 11 of the first connection member 1 has a suitable size, so that when the inserting portion 11 is inserted into the insertion groove 21 of the second connection member 2, the first attaching surface 13 is closely attached against the second attaching surface 24.

Since the wireless charging device is used in underwater circumstances, the space in the insertion groove 21 of the second connection member 2 is occupied by water. Accordingly, when the inserting portion 11 of the first connection member 1 is inserted into the insertion groove 21 of the second connection member 2 to allow the first connection member 1 to be combined with the second connection member 2, the inserting portion 11 replaces the space of the water and occupies the space of the insertion groove 21, and the water originally in the insertion groove 21 is drained by the drain hole 22. After the inserting portion 11 is inserted into the insertion groove 21, because the first attaching surface 13 is closely attached against the second attaching surface 24, water can be drained from the space between the first attaching surface 13 and the second attaching surface 24. Hence, because the space between the power emitting unit 12 and the power receiving unit 23 is free of water, the transmission of the electromagnetic waves can be smoothly, and the charging efficiency of the power receiving unit 23 can be improved.

Moreover, the present invention may be applied to different underwater electronic device. As shown in FIG. 6, the second connection member 2 may be assembled on a diving suit 3 capable of being heated by electricity. The power receiving unit 23 is electrically connected to the diving suit 3 to provide electricity for the diving suit 3. When the second battery 231 of the power receiving unit 23 runs out of power and cannot drive the diving suit 3 to generate heat, the inserting portion 11 of the first connection member 1 is inserted into the insertion groove 21 of the second connection member 2. Hence, the second battery 231 can be charged based on the aforementioned manner, so that the diving suit 3 can continue to perform function.

As shown in FIG. 7, the second connection member 2 may be assembled on an underwater searchlight 4 capable of being driven by electricity. The power receiving unit 23 is electrically connected to the underwater searchlight 4 to provide electricity for the underwater searchlight 4. When the second battery 231 of the power receiving unit 23 runs out of power and cannot drive the underwater searchlight 4, the inserting portion 11 of the first connection member 1 is inserted into the insertion groove 21 of the second connection member 2. Hence, the second battery 231 can be charged based on the aforementioned manner, so that the underwater searchlight 4 can continue to perform function.

As shown in FIG. 8, the second connection member 2 may be assembled on an underwater camera 5 capable of being driven by electricity. The power receiving unit 23 is electrically connected to the underwater camera 5 to provide electricity for the underwater camera 5. When the second battery 231 of the power receiving unit 23 runs out of power and cannot drive the underwater camera 5, the inserting portion 11 of the first connection member 1 is inserted into the insertion groove 21 of the second connection member 2. Hence, the second battery 231 can be charged based on the aforementioned manner, so that the underwater camera 5 can continue to perform function.

As shown in FIG. 9, the second connection member 2 may be assembled on an underwater propeller 6 capable of being driven by electricity. The power receiving unit 23 is electrically connected to the underwater propeller 6 to provide electricity for the underwater propeller 6. When the second battery 231 of the power receiving unit 23 runs out of power and cannot drive the underwater propeller 6, the inserting portion 11 of the first connection member 1 is inserted into the insertion groove 21 of the second connection member 2. Hence, the second battery 231 can be charged based on the aforementioned manner, so that the underwater propeller 6 can continue to perform function.

What is claimed is:

1. A drainable wireless charging device, comprising:
a power emitting unit, converting electrical energy into electromagnetic waves and emitting the electromagnetic waves outwardly, wherein the power emitting unit is assembled on a first connection member in a waterproof manner;
a power receiving unit, receiving and converting the electromagnetic waves into electrical energy and storing the electrical energy, wherein the power receiving unit is assembled on a second connection member in a waterproof manner;
one of the connection members comprising an insertion groove, and the other connection member comprising an inserting portion, wherein the insertion groove comprises a drain hole communicating with outside, and the insertion groove comprises a second attaching surface corresponding to the power receiving unit, the inserting portion comprises a first attaching surface corresponding to the power emitting unit, the first connection member and the second connection member are capable of being combined with each other by inserting the inserting portion into the insertion groove, the first attaching surface is closely attached against the second attaching surface, so that water is drained from a space between the first attaching surface and the second attaching surface.

2. The drainable wireless charging device according to claim 1, wherein the power emitting unit comprises a battery and an electromagnetic wave emitter which are packed by a detachable waterproof housing, the housing is openable for replacing the battery.

3. The drainable wireless charging device according to claim 1, wherein the power emitting unit comprises a battery and an electromagnetic wave emitter which are packed by an undetachable waterproof housing, the power emitting unit further comprises an electromagnetic wave receiver electrically connected to the battery for receiving the electromagnetic waves and converting the electromagnetic waves into electrical energy for storing in the battery.

4. The drainable wireless charging device according to claim 2, wherein the second connection member is assembled on a diving suit capable of being heated by electricity, wherein the power receiving unit is electrically connected to the diving suit to provide electricity to the diving suit.

5. The drainable wireless charging device according to claim 3, wherein the second connection member is assembled on a diving suit capable of being heated by electricity, wherein the power receiving unit is electrically connected to the diving suit to provide electricity for the diving suit.

6. The drainable wireless charging device according to claim 2, wherein the second connection member is assembled on an underwater searchlight capable of being driven by electricity, wherein the power receiving unit is electrically connected to the underwater searchlight to provide electricity for the underwater searchlight.

7. The drainable wireless charging device according to claim 3, wherein the second connection member is assembled on an underwater searchlight capable of being driven by electricity, wherein the power receiving unit is electrically connected to the underwater searchlight to provide electricity for the underwater searchlight.

8. The drainable wireless charging device according to claim 2, wherein the second connection member is assembled on an underwater camera capable of being driven by electricity, wherein the power receiving unit is electrically connected to the underwater camera to provide electricity for the underwater camera.

9. The drainable wireless charging device according to claim 3, wherein the second connection member is assembled on an underwater camera capable of being driven by electricity, wherein the power receiving unit is electrically connected to the underwater camera to provide electricity for the underwater camera.

10. The drainable wireless charging device according to claim 2, wherein the second connection member is assembled on an underwater propeller capable of being driven by electricity, wherein the power receiving unit is electrically connected to the underwater propeller to provide electricity for the underwater propeller.

11. The drainable wireless charging device according to claim 3, wherein the second connection member is assembled on an underwater propeller capable of being driven by electricity, wherein the power receiving unit is electrically connected to the underwater propeller to provide electricity for the underwater propeller.

* * * * *